INVENTORS
HILLIARD R. DiVETO
ALLAN W. HOUGH
BY Russel C. Wells
ATTORNEY

INVENTORS
HILLIARD R. DiVETO
ALLAN W. HOUGH
BY Russel C. Wells
ATTORNEY

United States Patent Office 3,424,392
Patented Jan. 28, 1969

3,424,392
SERVO LOOP CONTROL APPARATUS FOR MONITORING AND MAINTAINING WEB TENSION

Hilliard R. Di Veto, Plymouth, and Allan W. Hough, Detroit, Mich., assignors to Burroughs Corporation, Detroit, Mich., a corporation of Michigan Filed Mar. 30, 1967, Ser. No. 627,139
U.S. Cl. 242—55.12 3 Claims
Int. Cl. G11b *15/44;* H02p *7/00*

ABSTRACT OF THE DISCLOSURE

An apparatus for maintaining continuous tension control of a web by monitoring the change in length of the web between a pair of known points and translating that change into electrical signals. The length of the web is maintained between a fixed drive roller, a free-positioning alignment bobbin and the web reel. The amount of displacement and the direction of displacement are translated into electrical signals which are applied to the windings of a split-field series motor.

FIELD OF THE INVENTION

This invention relates to servo loop motor control apparatus in general and to web reeling control apparatus in particular.

SUMMARY OF INVENTION

The servo loop comprises in combination a split-field series motor, a pivotally mounted web length sensing arm operatively coupled to electromechanical transducing means for converting the sense and the displacement of the sensing arm into electrical control signals and means for amplifying the control signals. The amplified control signals are applied to the control windings of the split-field series motor. The motor controls the reeling and unreeling rotation of the web reel in response to the change in the length of the web as indicated by the position of the sensing arm thereby maintaining a constant predetermined tension on the web as it is fed through the web apparatus.

In magnetic tape readers, as one illustration of a web machine, it is necessary for the tape to accelerate to the correct speed for data transmission and deaccelerate to a full stop within a very short displacement of tape. To accomplish these difficult time requirements, split-field series motors with low drag web sensing mechanisms and solid state control techniques are employed. As a result, we are able to achieve, for a very low cost, an accurate tape servo loop control to satisfy the demands of computer operations.

We have used as a sensing arm a long arm pivoted about one end and having a free-positioning alignment bobbin mounted on the other end, and have placed this arm in the guiding path of the magnetic tape.

By biasing one field winding of the motor, we have in effect placed the motor in a condition of readiness by having the field flux built up in that winding. The control circuitry supplies an equal amount of current to the second field winding when the arm is in its normal operating position, thus having a condition wherein no net field flux is available to the motor. When the control circuitry supplies an amount of current which is different from the biased amount, a net field flux is generated and the motor operates.

DESCRIPTION OF DRAWINGS

The invention, both as to its organization and method of operation, together with further objects and advantages thereof, will best be understood by reference to the following detailed description taken in connection with the accompanying views of the drawing in which.

DETAILED DESCRIPTION

*Mechanical structure*

Figure 4:
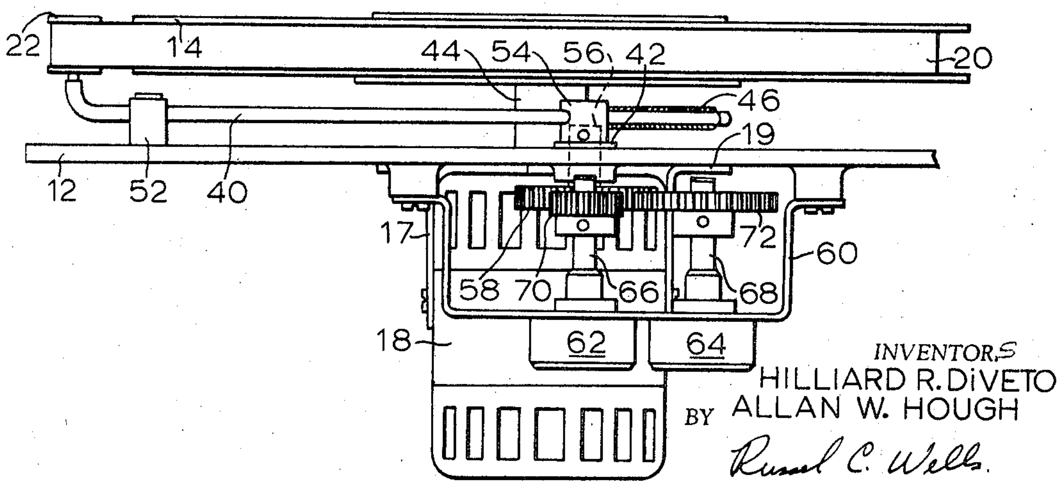
FIG. 4 is a side view of FIG. 3.

Journalled in the base plate 12 of the magnetic tape unit 10 is a pair of tape reels 14 and 16 which may be identified as a tape take-up reel 14 and a tape storage reel 16, respectively. Each reel 14 and 16 is coupled to the armature shaft of a separate split-field motor which is mounted to the base plate 12 by a pair of brackets 17 and 19. One of such reel motors 18 is shown in FIG. 4, although it is to be understood that each reel has a motor.

The magnetic tape 20 is fed from the storage reel 16 around a free positioning guide bobbin 38 and between a pair of rollers 34 and 36 comprising the tape braking unit. The first roller 34 of the pair is fixed, and the second roller 36 is a pinch roller which cooperates with the first roller 34 to halt the movement of the magnetic tape 20 upon command from the control unit, which is not shown. From the braking unit, the tape is wrapped around the read and record unit 28 due to the guiding of the two rollers 30 and 32 which are adjacent and on either side of the read and record unit 28. Next the tape is fed between the capstan drive roller 24 and its corresponding pinch roller 26. Then the magnetic tape 20 is guided around a second free-positioning guide bobbin 22 which is identical to the first free-positioning guide bobbin 38 and then to the take-up reel 14.

The free-positioning guide bobbin 22 is mounted on the tape storage arm 40. The arm 40 is journalled in the base plate 12 through a bushing 42 which is in juxtaposition to the tape storage reel mounting shaft 44. The tape storage arm 40 is biased by a spring 46 connected to one end of the arm 40 and secured to the base plate 12 by a post 48. The biasing force of the spring 46 is in a direction which rotates the arm 40 away from the record-read head 28. The arcual movement of the arm 40 is restrained by a pair of bumper stops 50 and 52 which are mounted on the base plate 12. Secured to the hub 54 on the tape storage arm 40 and extending through the bushing 42 is a shaft 56. Attached to the end of the shaft 56 is a gear wheel 58.

Mounted on the motor side of the base plate 12 by means of a suitable bracket 60 are two potentiometers 62 and 64 which function as electromechanical transducers. Attached to the potentiometer shafts 66 and 68 are two gear wheels 70 and 72 which are in mesh with the previously mentioned gear wheel 58 but are not in mesh with each other. In the preferred embodiment, gears 58 and 72 have a ratio of 1:1 while the ratio between gears 58 and 70 is 1:2.

Figure 1:
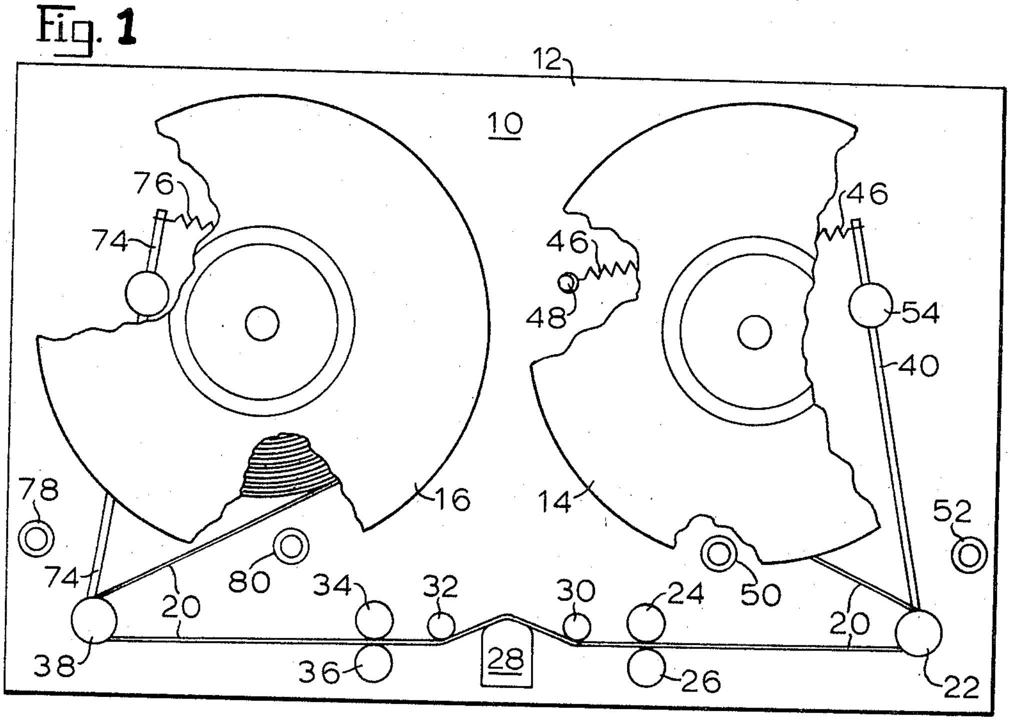
FIG. 1 is a plan view with several parts broken away for clarity.
Figure 3:
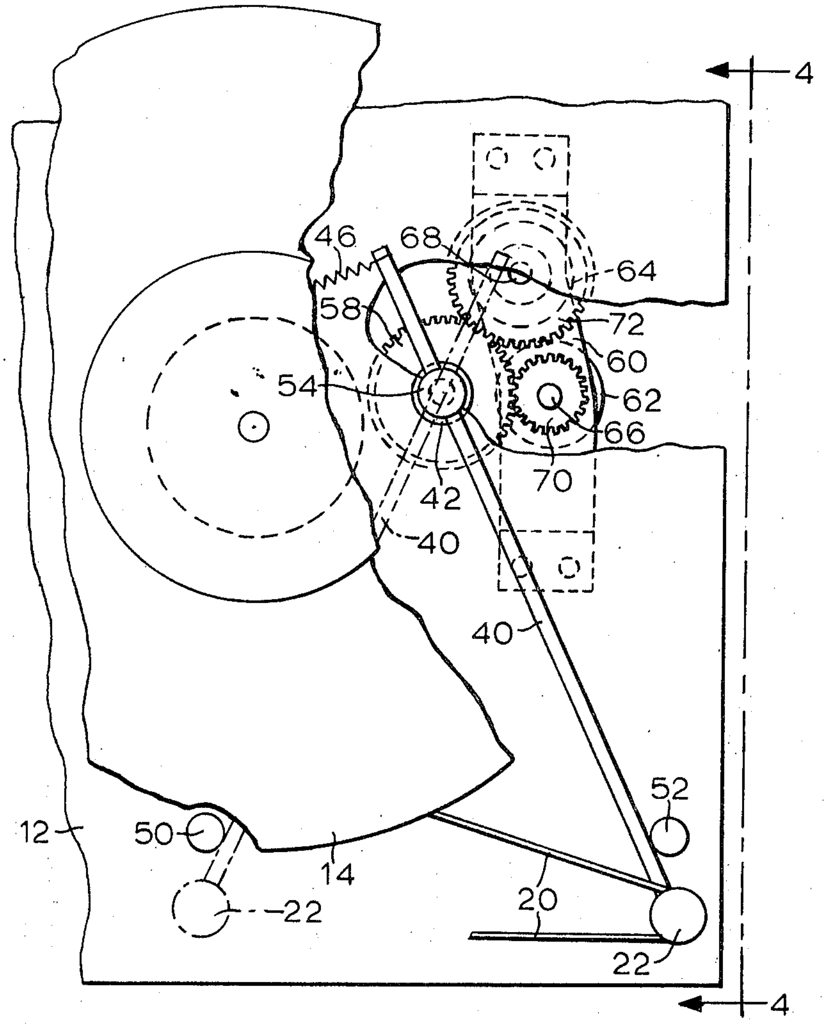
FIG. 3 is a fragmentary partial-plan view of the right hand portion of FIG. 1 and having parts broken away to show the inner details.

The above description has been primarily directed to the right hand portion of FIGURE 1, which is also shown in FIGURE 3. To the left of record and read unit 28 of FIGURE 1, the mechanisms are substantially identical to that already disclosed. Associated with the storage reel 16 is another tape storage arm 74 which is substantially identical to arm 40. The arm 74 is also pivotally mounted to the base plate 12 and is biased in a direction away from the record-read unit 28 by a spring 76. Likewise, two bumpers 78 and 80 define the limits of the arcual movement of the arm 74 in a manner which is similar to the previously disclosed bumpers 50 and 52.

Located on the motor side of the base plate 12 and cooperating with the arm 74 is a potentiometer and gearing system substantially identical to that which has been herein disclosed for arm 40.

*Electrical structure*

Figure 2:
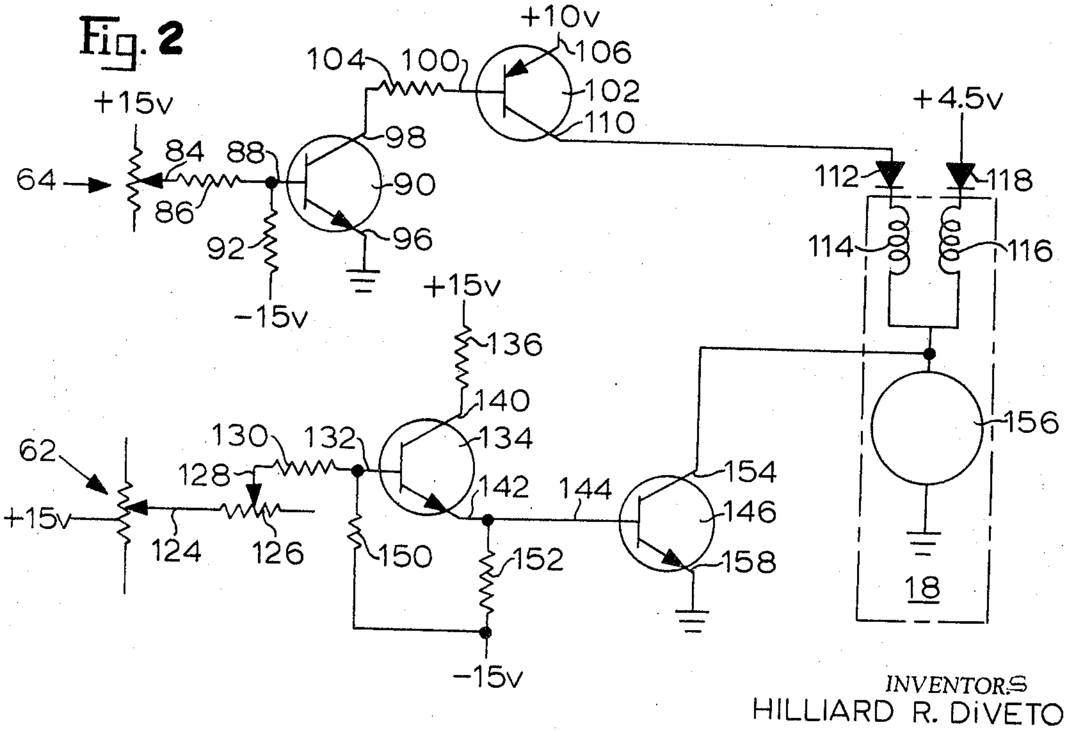
FIG. 2 is a circuit schematic of the electrical circuit of the invention.

The electronic control circuit, as shown in FIGURE 2, controls three functions of the motor. The first function is the control and regulation of the motor speed, the second function is the control of the direction of motor rotation and the third function is the application of motor damping control. The first two functions; namely, speed control and direction of rotation, are controlled through the action of a first potentiometer 64 and the third function, damping, is controlled through the action of a second potentiometer 62.

Potentiometer 64 functions as an analog input to the speed and rotation control circuit. To one end of the winding of the potentiometer 64, a voltage source of +15 volts is applied and the other end of the winding is an open connection. Interposed between wiper 84 of the potentiometer 64 and base 88 of the first stage transistor 90 is a resistor 86. Also connected to the base 88 is a biasing resistor 92 which is returned to a second voltage source of −15 volts. The transistor 90 is connected in a grounded emitter configuration having its collector 98 connected through a resistor 104 to the base 100 of a second transistor 102.

The emitter 106 of the second transistor 102 is connected to another voltage source of +10 volts, and the collector 110 is coupled through a diode 112 to one of the split-field windings 114 of the motor 18. The second winding 116 is connected by a diode 118 to a biasing voltage source of +4.5 volts.

Potentiometer 62 functions as the input analog element to the variable bi-directional motor damping circuit. The winding of the potentiometer 62 is center tapped, and a voltage source of +15 volts is applied to the center tapped lead. In series with the wiper 124 of the potentiometer 62 is another potentiometer 126. The wiper 128 of this potentiometer 126 is connected through a resistor 130 to the base 132 of the first stage transistor 134. A load resistor 136 is connected from the +15 volt voltage source to the collector 140 of the transistor 134. The emitter 142 is connected to the base 144 of the second stage transistor 146. Both the base 132 and the emitter 142 of the first stage transistor 134 are returned to the −15 volt voltage source through resistors 150 and 152, respectively. The collector 154 of the second stage transistor 146 is connected to the junction of the two split-field windings 114 and 116 and the armature 156 of the motor 18. The other end of the armature 156 and the emitter 158 of the second stage transistor 146 are connected to ground potential.

In the preferred embodiment, the following particular component values were used in the electrical portion of the servo loop:

| Component: | | Value/type |
|---|---|---|
| 64 | ohms | 100K |
| 86 | do | 7500 |
| 92 | do | 12K |
| 90 | | 2N3054 |
| 102 | | 2N2081 |
| 104 | ohms | 120 |
| 62 | do | 5000 |
| 126 | do | 500 |
| 130 | do | 390 |
| 150 | do | 1000 |
| 134 | | 2N3054 |
| 136 | ohms | 47 |
| 152 | do | 1200 |
| 146 | | 2N3055 |

OPERATION

In FIGURE 1, there is shown a plan view of a magnetic tape unit which is representative of those used with computers. One of the many factors which affect accurate reading and recording on magnetic tape is the relationship between the magnetic tape and the read-record unit. In one system, the tape may be in physical contact with the read and record unit, while in another system it may be desirable to maintain a precise spaced relationship between the read and record unit and the tape. In either situation, the magnetic tape itself must be retained under controlled tension.

To drive the tape reels and to maintain the proper tape tension throughout the tape system, a split-field series motor was selected. The split-field series motor has two separate and complete field windings which are wound so as to control the direction of rotation of the motor by either winding. Conventional use of a split-field motor, wherein the voltage applied to the motor is switched from one field winding to the other depending upon the desired direction of rotation, does not alter the response time of the motor which is defined as the time lag from the time the voltage is applied to the motor until the time the motor is operating at the desired output torque requirements. To reduce the response time, we have placed a bias voltage on the second field winding which is sufficient to operate the motor in a given direction; namely, counterclockwise at the required torque output and to the first field winding, we have connected control circuitry which is capable of supplying sufficient current to reverse the direction of the motor to that of clockwise rotation, as viewed in FIGURE 1.

The direction and speed of the split-field motor is dependent upon the net or resultant field flux from the two field windings. Thus, when the power is applied to the system and the motor is to remain stationary, the control circuitry in series with the first field winding must supply an amount of current which is equal to the amount of current in the second winding, so that the net field flux is zero. This condition is best described as the steady state condition of the servo loop. Therefore, whenever the tension of the web changes, the net field flux becomes greater than zero due to the change of the field current in the first winding. Therefore, we have effectively reduced the response time of the system by not requiring the field flux to build up from zero each time the motor is required to operate.

The operating speed of the magnetic tape, relative to reading and recording, is controlled by the capstan drive unit. The reel motors control the tape reeling and unreeling in order to supply a sufficient amount of tape to the capstan drive unit and to maintain the correct tension on the tape.

Through the operation of the tape storage arms 40 and 74, a single storage loop of magnetic tape is maintained on either side of the read and record unit enabling the tape reel drive system to maintain a constant controlled tension on the tape.

The tape storage loop is defined as the length of tape from the tangent point of the tape leaving the tape storage reel 14 around the free-positioning guide bobbin 22 to the point where the tape 20 passes between the capstan drive roller 24 and its corresponding pinch roller 26.

As is shown in FIGURE 3, the tape storage arm 40 pivots around shaft 56 in an arcual motion from a first position against the bumper stop 52 to a second position against the bumper stop 50. This arcual motion causes the gear 58 to drive the two other gears 70 and 72 which in turn, as hereinbefore described, position the wipers 124 and 84 in the potentiometers 62 and 64.

The null position of the tape storage arms 40 and 74 is substantially midway between the bumpers 50, 52 and 78, 80, respectively. At this null point, the tape reel drive motor has maximum damping applied across the armature for as long as the arm is retained in this position.

If the damping control on the motor was not operative, the arm, because of slight oscillation along the arc, would not settle on a null point but instead would "hunt" back and forth seeking the null point. This "hunting" would cause the armature of the motor to be constantly changing direction of rotation and thereby causing excessive wear in the motor bearings. Should this "hunting" continue, not only would excessive wear result on all the several components coupled to the motor, but also the quality of the signal as read from the tape by the read and record unit would be unacceptable due to the variation of the tape speed caused by the "hunting."

During feeding, if the length of the tape storage loop is altered, the arm will move away from the null point under the urging of the spring 46 if the length of the tape storage loop becomes longer, or under the pull of the magnetic tape 20 if the length of the tape storage loop becomes smaller. For purposes of illustration, consider the length of the tape storage loop from the tape reel 14, as shown in FIGURE 3, becoming smaller due to the tape storage arm 40 rotating from the null point toward bumper 50. The tape reel motor 18 must decrease in speed to allow the tape storage loop to lengthen, so that the arm will return to the null point. This operation is accomplished in the following manner.

Referring to FIGURE 2, the split-field winding of the motor 18 is diagrammatically shown by two coils 114 and 116 which are connected together and joined to the armature 156. The voltage applied to each of these coils is isolated from the other coil by the two diodes 112 and 118. FIGURE 2 further shows a fixed voltage bias system on one coil 116 and a controlled voltage bias system on the other coil 114. At the null point, the voltage applied to both coils is equal and the net magnetic field flux is zero. Therefore, the motor will not rotate under power, but if the voltage on the coils 114 and 116 becomes unbalanced resulting in a net magnetic field flux which is greater than zero, the motor will rotate in the direction determined by the coil having the largest applied voltage.

As heretofore mentioned, by using the fixed bias voltage on one winding, the servo loop control is quicker to respond timewise than if neither winding had a voltage applied until it was desired to operate the motor.

When the length of the tape storage loop becomes smaller and the tape storage arm approaches the previously mentioned second position against bumper 50, the motor must rotate in a counterclockwise direction in order to reduce the rate at which the tape is being reeled. With the additional length tape, the bias force of the spring 46 will return the tape storage arm to the null point. Since the tension on the magnetic tape is greater than the bias force of the spring 46, the tape reel motor must slow down to allow the storage loop to increase in length in order for the spring 46 to have any positive effect on the rotation of the tape storage arm 40.

As the tape storage arm 40 moves in a clockwise direction from the null point to the second position, the gear 58 drives a second gear 72 moving the wiper 84 of the potentiometer 64 in a counterclockwise direction. This increases the effective resistance of the potentiometer 64 and decreases the forward bias voltage on the base 88 of the first stage transistor 90 causing the transistor 90 to gradually go out of conduction. As the transistor 90 gradually goes out of conduction, the collector 98 draws less current from the emitter base junction of the second stage transistor 102. As collector current of the first stage transistor 90 decreases, the base current of the second stage transistor 102 also decreases which in turn decreases the collector current which is applied to the field winding coil 114. When the amount of the collector current of the second stage transistor 102 is exceeded by the amount of current supplied by the fixed bias voltage of the second field coil 116, the motor armature will rotate in a direction determined by the field winding 116. In the illustration given, decreasing the current applied to field coil 114 below that supplied by the fixed bias voltage on the second field coil 116 will cause the armature to rotate in a counterclockwise direction.

In direct proportion to the difference between the collector current of the second stage transistor 102 supplied to the coil 114 and the current supplied by the bias voltage on the coil 116, the rotational speed and torque output of the motor 18 will be determined. The larger this difference, the greater the speed and the available torque output. Thus, under the condition described with the tape storage arm 40 in the second position, the tape reel motor 18 will rotate in a counterclockwise direction at the system's maximum speed and torque requirements so as to restore the tape storage arm to the null position.

Simultaneous with the rotation of wiper 84 of the potentiometer 64, the gear 58 also rotates a third gear 70. This gear 70 controls the wiper 124 of the second potentiometer 62. The type of and the use of this potentiometer 62 is different than that previously described for the first potentiometer 64. In the preferred embodiment, the second potentiometer 62 has a center tap connection on its winding. As is shown in FIGURE 2, a bias voltage of +15 volts is applied to this center tap, and the ends of the winding have no applied potential.

When the tape storage arm 40 is at the null point, which as hereinbefore described is a position midway between the bumpers 50 and 52, the wiper 124 of the potentiometer 62 is in the center of the winding. By manually adjusting the wiper 128 of a third potentiometer 126, the first stage transistor 134 is driven into full conduction. The second stage transistor 146, since it is in an emitter follower configuration with the first stage transistor 134, is also in full conduction. As shown in FIGURE 2, the second stage transistor 146 is connected in parallel with the armature 156 of the tape reel motor 18, therefore, full conduction of this transistor 146 short circuits the motor armature. By short circuiting a motor armature, the armature is prevented from rotating.

As the wiper 124 is moved away from the center position of the potentiometer 62, the conduction state of the second stage transistor gradually changes from that of saturation or "on" to that of no conduction or "off." With the wiper 124 positioned at either end of the potentiometer 62 which corresponds to either the first or second position of the arm 40, the transistor 146 becomes a very high impedance element across the armature, therefore, not affecting the rotation of the armature.

Thus, as the tape storage arm 40 pivots around the mounting shaft 56, the wipers 84 and 124 of the two potentiometers 64 and 62 translate the arcual motion of the arm into separate electronic signals, which when applied to the motor 18 control its speed, damping and direction of rotation. The portion of the electronic circuit containing the potentiometer 64 performs the speed and directional control function, and that portion of the electronic circuit containing the second potentiometer 62 controls the damping function of the controlling apparatus.

While a particular embodiment of the invention has been shown, it will be understood, of course, that it is not desired that the invention be limited thereto since modifications may be made.

We claim:

1. A closed loop control system for maintaining the tension on a web in a web reeling and unreeling system comprising:
   - a split-field motor having electrically parallel first and second field windings connected in series with the armature winding, said motor operatively coupled to a web reel,
   - sensing means disposed in the path of the web for monitoring the tension of the web, first and second transducer means coupled to said sensing means, first amplifying means having an input and an output whereby the input is connected to the first transducer means and the output is connected in series with the first field winding of the motor, second amplifying means having an input and an output whereby the input is connected to the second transducer means and the output is connected in parallel with the armature winding of the motor, and a biasing potential connected to second field winding for establishing a reference level of field flux in the motor thereby substantially improving the response time of the control system.

2. The combination of claim 1 wherein the first transducer means is a potentiometer having a linear taper response.

3. The combination of claim 2 wherein the second transducer means is a potentiometer with a linear taper response and having a fixed electrical connector at substantially the midpoint of the resistance winding.

References Cited

UNITED STATES PATENTS

| | | | |
|---|---|---|---|
| 2,985,396 | 5/1961 | Johnson | 242—55.12 |
| 3,318,547 | 5/1967 | Bejach | 242—75.51 X |

GEORGE F. MAUTZ, *Primary Examiner.*

U.S. Cl. X.R.

242—75.51; 318—6